US006992723B1

(12) United States Patent
Wulf et al.

(10) Patent No.: US 6,992,723 B1
(45) Date of Patent: Jan. 31, 2006

(54) INTEGRATED ENCLOSURE FOR VIDEO SURVEILLANCE CAMERA

(75) Inventors: John Douglas Wulf, Palm Beach County, FL (US); Luis E. Anderson, Palm Beach County, FL (US); Mark A. Hauge, Palm Beach County, FL (US); James R. Paolantonio, Broward County, FL (US); Steven W. Schieltz, Palm Beach County, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 971 days.

(21) Appl. No.: 09/609,057

(22) Filed: Jun. 30, 2000

(51) Int. Cl.
*H04N 5/225* (2006.01)

(52) U.S. Cl. ....................... 348/374; 348/144; 348/151

(58) Field of Classification Search ................ 348/373, 348/374, 143, 151, 144; D16/203
See application file for complete search history.

(56) References Cited

U.S. PATENT DOCUMENTS 4,096,315 A * 6/1978 Kubacki ..................... 428/412
4,320,949 A 3/1982 Pagano ........................ 354/81
4,414,576 A 11/1983 Randmae .................... 358/229
4,833,534 A * 5/1989 Paff et al. ................... 348/151
4,984,089 A 1/1991 Stiepel et al. ............... 358/229
5,121,215 A * 6/1992 Boers et al. ................ 348/143
5,181,120 A * 1/1993 Hickey et al. .............. 348/143
5,394,184 A 2/1995 Anderson et al. ........... 348/151
5,418,567 A * 5/1995 Boers et al. ................ 348/143
5,517,236 A 5/1996 Sergeant et al. ............ 348/143
5,627,616 A 5/1997 Sergeant et al. .............. 354/81
5,649,255 A 7/1997 Schieltz ...................... 396/427
5,659,787 A 8/1997 Schieltz ................. 395/200.56
5,689,304 A 11/1997 Jones et al. ................. 348/373
5,931,432 A * 8/1999 Herold et al. ............... 248/343
6,061,087 A 5/2000 Schieltz et al. ............. 348/151
6,234,691 B1 * 5/2001 Jones et al. ................. 348/143
6,268,882 B1 * 7/2001 Elberbaum .................. 348/143

FOREIGN PATENT DOCUMENTS

WO PCT/IB98/00482 4/1998
WO PCT/IB99/00982 5/1999

* cited by examiner

*Primary Examiner*—Wendy R. Garber
*Assistant Examiner*—Jason Whipkey

(57) ABSTRACT

A video surveillance camera enclosure that includes a camera housing for receiving a video surveillance camera chassis through a lower end. In one embodiment, the housing is adapted to be inserted into an opening in a ceiling member and includes a flange near the lower end and a plurality of mounting clamps for engaging the perimeter of an opening in the ceiling. The video surveillance camera chassis includes a plurality of positioning members on the perimeter of the chassis. The positioning members are engageable with a plurality of alignment flanges on the interior of the housing to guide the chassis into a preselected position within the housing. Final insertion of the chassis into the housing and electrical connection via blind mating connectors is by threaded fasteners on the positioning members and flanges. In an alternate embodiment, the housing is installed in an enclosure that is not installed in a ceiling but is self-contained and can be located outdoors. In the outdoor installation, a heater and fan assembly can be connected to the chassis. Selection of an address for installation of the camera can be accomplished without the need to disassemble the dome assembly. LEDs can be viewed from below the camera chassis for installation and service.

31 Claims, 7 Drawing Sheets

INTEGRATED ENCLOSURE FOR VIDEO SURVEILLANCE CAMERA

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to video surveillance cameras, and more particularly to an improved enclosure and mounting chassis for a video surveillance camera.

2. Description of the Related Art

Presently, installation, set-up, and servicing of video surveillance camera enclosures are relatively difficult and time consuming. Installation of the surveillance camera requires assembly of the camera chassis into the enclosure at the installation site to accommodate cable connection and data addressing. In addition, servicing of installed cameras often requires partial, if not complete disassembly of the camera chassis, which results in increased repair time and costs.

An improved video surveillance camera enclosure is desired, which reduces the time and costs associated with installation and service.

BRIEF SUMMARY OF THE INVENTION

One aspect of the present invention is a video surveillance camera enclosure that includes a camera housing for receiving a video surveillance camera chassis through a lower end. The housing is adapted to be inserted into an opening in a ceiling member and includes at least one connector on an upper end of the housing for electrical connection to a video surveillance camera monitoring system. The video surveillance camera monitoring system is typically comprised of at least one video monitor and/or a video-recording device. The housing includes a flange near the lower end for engaging the lower surface of the perimeter of the opening in the ceiling member. A plurality of mounting clamps are positioned around the housing near the flange. The mounting clamps have a first position relatively flush with the exterior of said housing so the housing can be inserted into the opening. The mounting clamps have a second position extended substantially perpendicularly outward from the exterior of the housing for engaging the upper surface of the perimeter of the opening in the ceiling. The mounting clamps are moveable from the first position to the second position to capture the portion of the ceiling member, adjacent the opening, between the flange and the mounting clamps to secure the housing to the ceiling member. A video surveillance camera chassis and a video surveillance camera attached to the chassis can be inserted into the housing through the lower end for installation at a user's site.

The video surveillance camera chassis can include a plurality of positioning members on the perimeter of the chassis. The positioning members are engageable with a plurality of alignment flanges on the interior of the housing to guide the chassis into a preselected position within the housing. Each of the positioning members include a shoulder for releaseably engaging the corresponding alignment flanges. Each of the shoulders are moveable between a first position butted against the flange to capture the chassis in the preselected position and a second position free of the flange for removal of the chassis. Each shoulder is biased into the first position.

A first blind mating connector is located on the interior of said housing in the upper end and is adapted to mate with a second blind mating connector on the video surveillance camera chassis. Blind mating connectors are connectors that are adapted to mate together without the need for visually seeing the connectors. When the chassis is captured in its preselected position, the first and second blind mating connectors are in mateable relation to each other. A suitable fastener is used to compress the chassis toward the upper end of the housing to mate the first and second blind mating connectors together and to secure the chassis to the housing.

A printed circuit board, electrically connected to the second blind mating connector, can include at least one light emitting diode (LED), which can be remotely viewed at the lower end of the housing for set-up and/or trouble shooting of the video surveillance camera dome.

Another aspect of the present invention is a video surveillance camera chassis for mounting a video surveillance camera in a video surveillance camera housing. The chassis includes a support member having a lower end adapted for installation of a video surveillance camera and a plurality of positioning members on the perimeter of the support member. The positioning members are engageable with a plurality of alignment flanges on the interior of a video surveillance camera housing to guide the support member into a preselected position within the housing. Each of the positioning members includes a shoulder for releaseably engaging a corresponding alignment flange. Each of the shoulders are moveable between a first position butted against the flange to capture the support member in its preselected position and a second position free of the flange for removal of the support member. Each shoulder is biased in the first position.

In one embodiment, a first blind mating connector on the interior of the housing is adapted to mate with a second blind mating connector on the support member. When the support member is captured in its preselected position, the first and second blind mating connectors are in mateable relation to each other. At least one fastener is used to compress the support member toward the upper end of the housing to mate the first and second blind mating connectors together and to secure the support member to the housing. A switch, selectable from the exterior of the housing without the need for disassembly, can be included on a printed circuit board connected to the support member.

In an alternate embodiment, for an enclosure with a housing adapted for mounting outside of a ceiling, or outdoors, an optical quality dome cover is installed on the lower portion of the enclosure. A switch, selectable from the exterior of the housing without the need for disassembly, can be included on a printed circuit board connected to the support member. At least one fan can be attached to the support member for circulating air across the printed circuit board, across a camera pan motor attached to the support member, and across the interior surface of a dome cover attached to the housing. A controllable heater element can be attached to the support member to heat the circulating air for outdoor installations.

A printed circuit board, which can be electrically connected to the blind mating connector, may include at least one light emitting diode (LED), which can be remotely viewed at the lower end of the housing for set-up and/or trouble shooting of the video surveillance camera dome.

Objectives, advantages, and applications of the present invention will be made apparent by the following detailed description of embodiments of the invention.

DETAILED DESCRIPTION OF THE INVENTION

Figure 1:
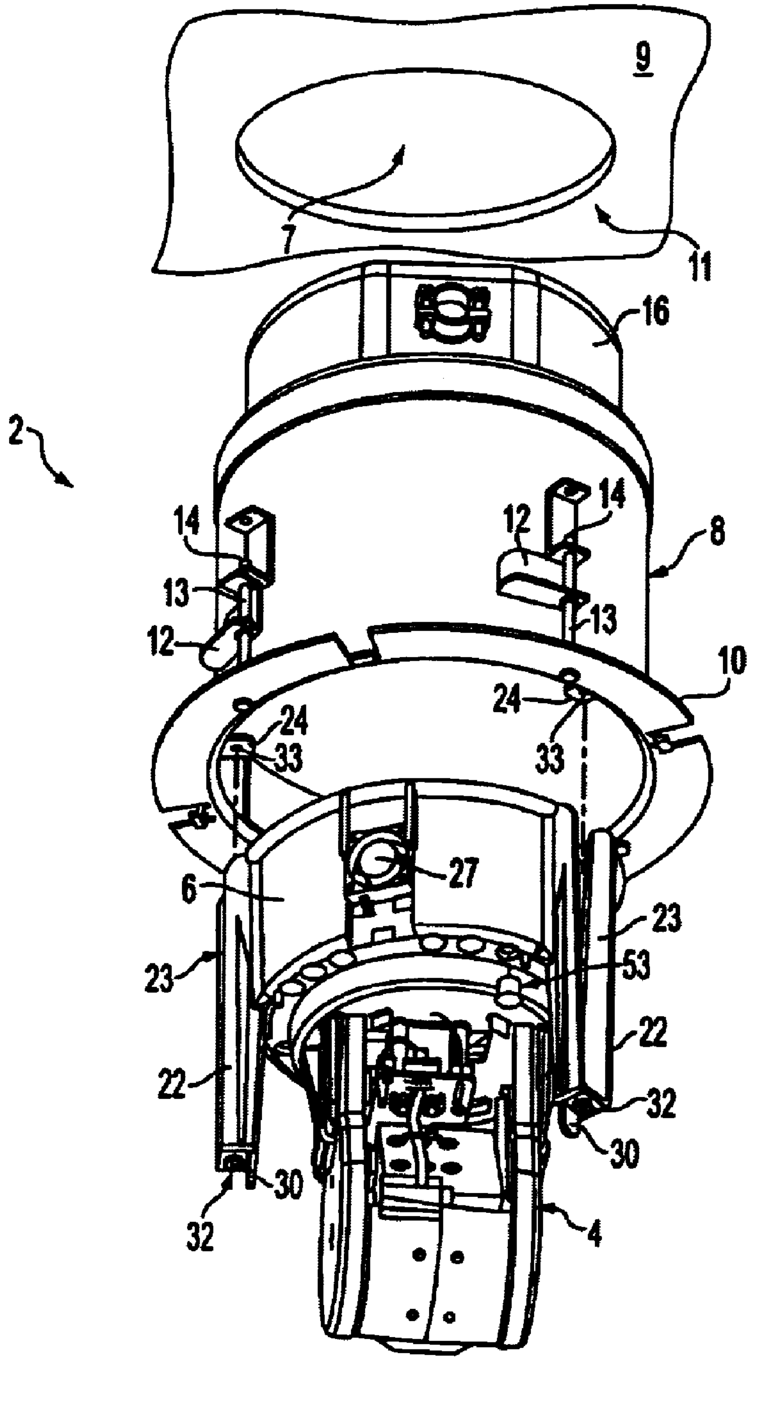
FIG. 1 is an exploded lower perspective view of one embodiment of the present invention.

Referring to FIG. 1, one embodiment of the present invention is illustrated at 2. Pan and tilt video camera assembly 4 is installed on video surveillance camera chassis 6. Chassis 6 is inserted into video surveillance camera housing 8 as illustrated and as fully described hereinbelow. Camera housing 8 is adapted to be inserted into a suitable opening 7 in a ceiling member 9. As illustrated in this example, housing 8 is shaped substantially like a cylinder and the corresponding opening 7 in the ceiling member 9 must be substantially circular and sized large enough in diameter to receive housing 8 but smaller in diameter than flange 10. Flange 10 will thus rest against the lower surface 11 of the ceiling at the perimeter of the opening when housing 8 is inserted therein. Housing 8 includes a plurality of mounting clamps 12 around the circumference of housing 8, each positioned on a threaded fastener 13. Mounting clamps 12 have a first position substantially flush with the exterior of housing 8 to facilitate insertion of housing 8 into the opening in the ceiling.

Figure 2:
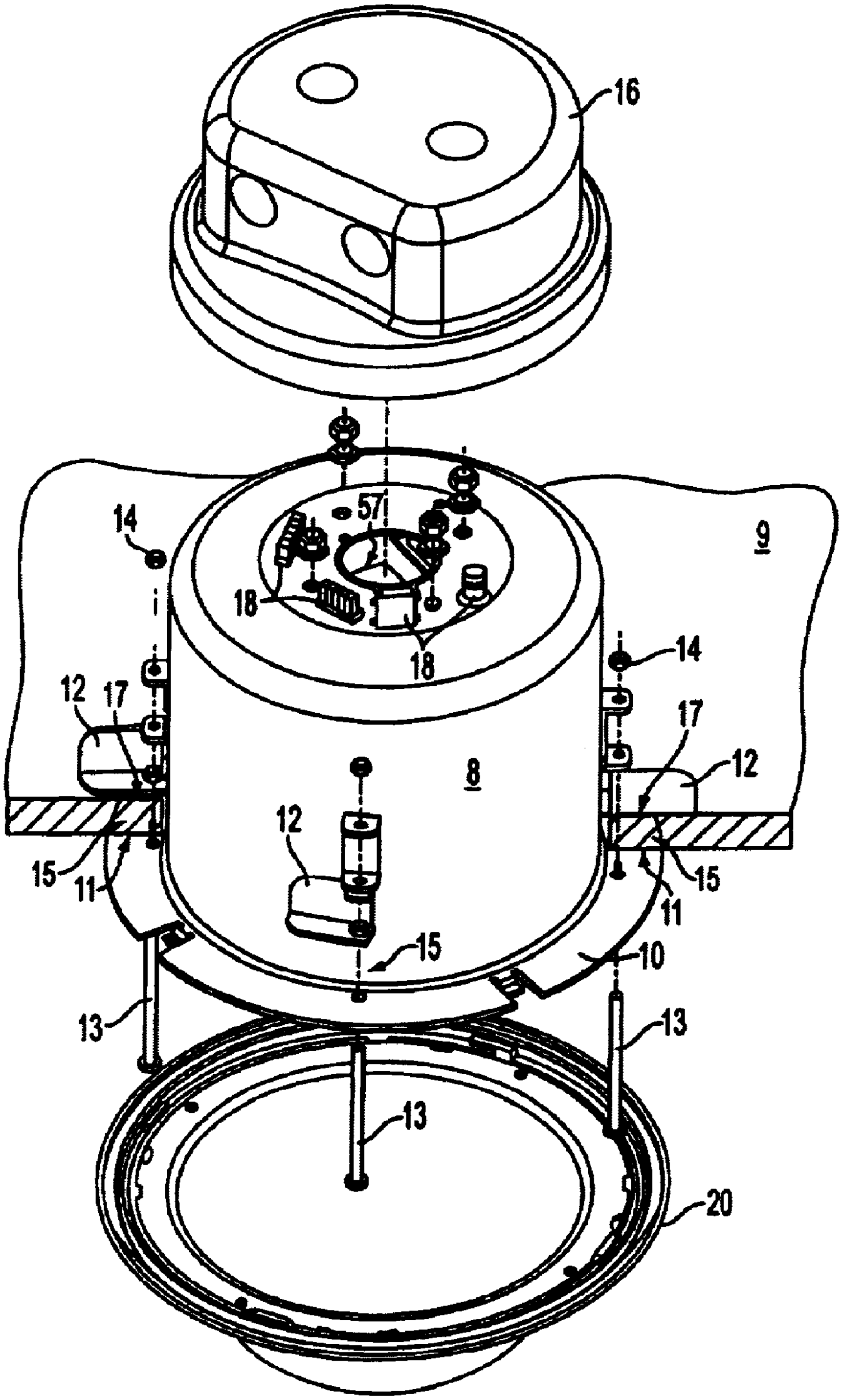
FIG. 2 is an exploded upper perspective view of one embodiment of the present invention.

Referring to FIG. 2, once housing 8 is inserted into the opening 7 in the ceiling member 9, threaded fasteners 13 are screwed into threaded nut 14 which moves mounting clamps 12 into a second position substantially perpendicular to housing 8 as illustrated. As threaded fasteners 13 are further screwed into nuts 14, mounting clamps 12 move closer to flange 10 and will engage the upper surface 17 of the ceiling at the perimeter of the opening 7. The perimeter of the ceiling member adjacent the opening will be captured in the space 15 between flange 10 and mounting clamps 12, and can be secured therein with additional movement of mounting clamps 12 by further screw adjustment of fasteners 13. Cover 16 can be used to protect the upper portion of housing 8, including connectors 18, from potential dirt and debris in the ceiling, and as may be required by code in certain installations. As fully described hereinbelow, connectors 18 allow easy connection to the wiring of a video surveillance camera system, which can consist of one or more video monitors and/or one or more video recording devices (not shown). An optical quality dome cover or bubble 20, which can be injection molded, can be installed at the lower end of housing 8.

Referring again to FIG. 1, a plurality of positioning members 22 on chassis 6 assist in the installation of chassis 6 into housing 8. Positioning members 6 have a guide channel 23 that receives and engages corresponding alignment flanges 24 positioned on the interior of housing 8 to guide chassis 6 into housing 8. For reasons that will become apparent, positioning members 22 and alignment flanges 24 are adapted so that chassis 6 can only be inserted into housing 8 in one preselected orientation. In this example, three positioning members 22 unevenly spaced about chassis 6 are used with corresponding alignment flanges 24 to place chassis 6 in the desired preselected position within housing 8. However, it is envisioned that any number of positioning members 22 and alignment flanges 24 can be strategically mounted and used to guide chassis 6 into the desired position within housing 8.

Figure 3:
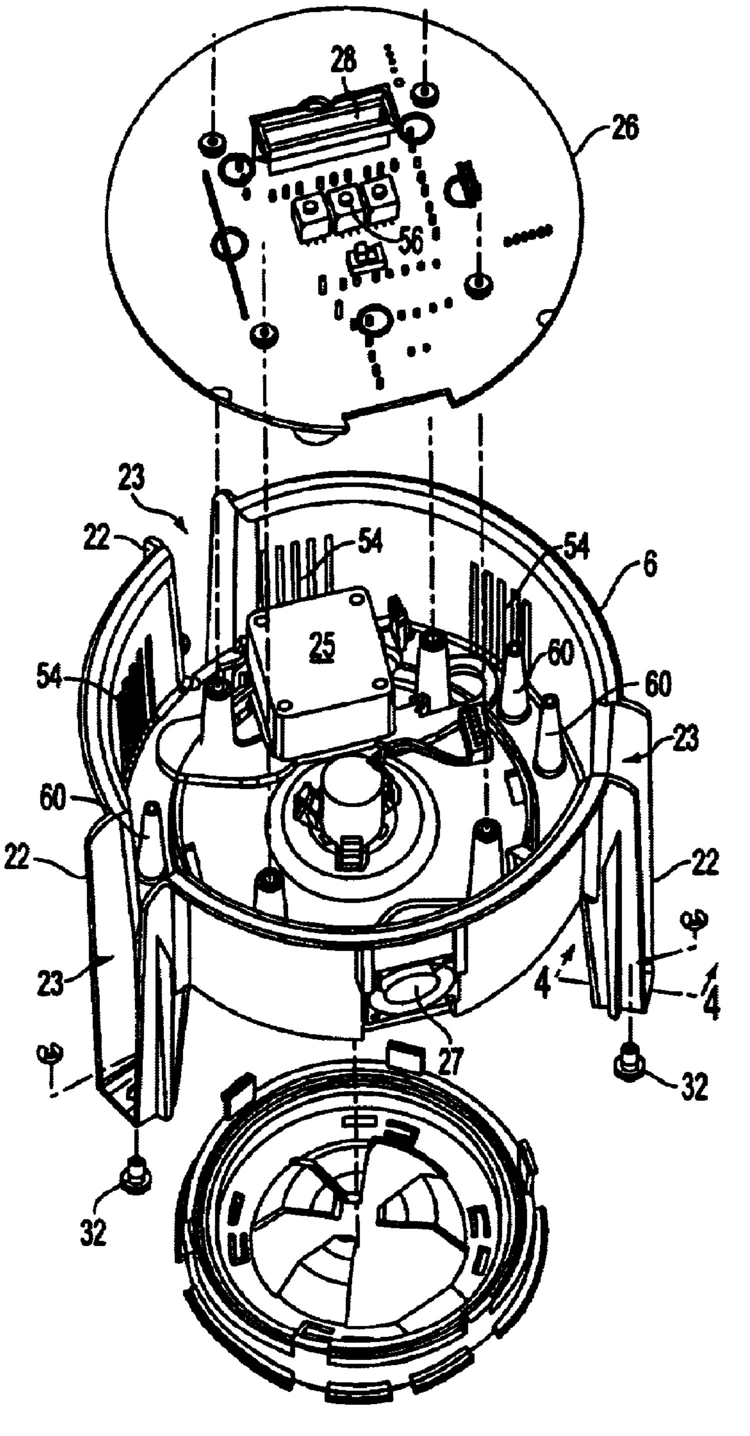
FIG. 3 is an exploded upper perspective view of one embodiment of the video surveillance camera chassis of the present invention.

Referring to FIG. 3, chassis 6 includes printed circuit board (PCB) 26 for interfacing pan and tilt camera assembly 4 and other electrical systems such as pan motor 25 and fan 27 to a video camera surveillance system. PCB 26 is connected to chassis 6 in a fixed orientation and includes connector 28, which mates with a second connector located on the inside of housing 8 (not shown). Connector 28 and its mate on the inside of housing 8 are connectors that are adapted to mate without the need for an installer to see the connectors, and are commonly called blind mating connectors.

Chassis 6 will typically be inserted into housing 8, after housing 8 has been installed in a ceiling. Housing 8 will be electrically connected to a video camera surveillance system via connectors 18. Chassis 6 is electrically connected to a second blind mating connector within housing 8, which is electrically connected to connectors 18. Positioning members 22 and alignment flanges 24 orient chassis 6 and PCB 26 so that blind mating connector 28 is properly aligned with the second blind mating connector within housing 8. If chassis 6 is pushed upward into housing 8 to mate blind mating connector 28 with the second blind mating connector on the interior of housing 8, the force is transferred directed to housing 8 and to the ceiling member to which housing 8 is attached. Too much force could be applied to the ceiling member, especially if the ceiling member is made of a fibrous tile typically used in drop ceilings. To prevent that occurring, each positioning member 22 includes a shoulder member 30, which engages each corresponding flange 24 to capture and suspend chassis 6 in a pre-connected, hands-free position prior to final connection as described below.

Figure 4:
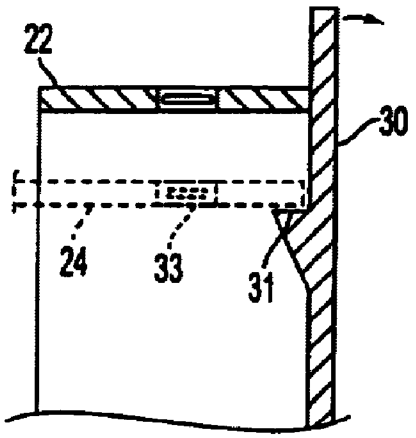
FIG. 4 is partial cross-sectional view taken along line 4—4 in FIG. 3.

Referring to FIG. 4, a cross-sectional view of a positioning member 22 illustrates shoulder member 30 having a shoulder 31 that engages flange 24 (shown in fantom). Shoulder members 30 can be biased against flange 24 and engage flanges 24 with an audible “click” so that an installer knows when chassis 6 is captured in place within housing 8. Once captured and suspended in the pre-connected position, threaded fasteners 32 thread into corresponding threaded apertures 33 in flanges 24, shown in FIG. 1. Upon tightening fasteners 32 into threaded apertures 33, chassis 6 is pulled further into housing 8 and blind mating connector 28 is mated with the second blind mating connector in the interior of housing 8 until fully seated. Therefore, the force of insertion of chassis 6 into housing 8 for final connection of the blind mating connectors, is not transferred to the ceiling, but is retained fully within housing 8 by fasteners 32 pulling into threaded apertures 33 and pulling chassis 6 into housing 8.

Figure 5:
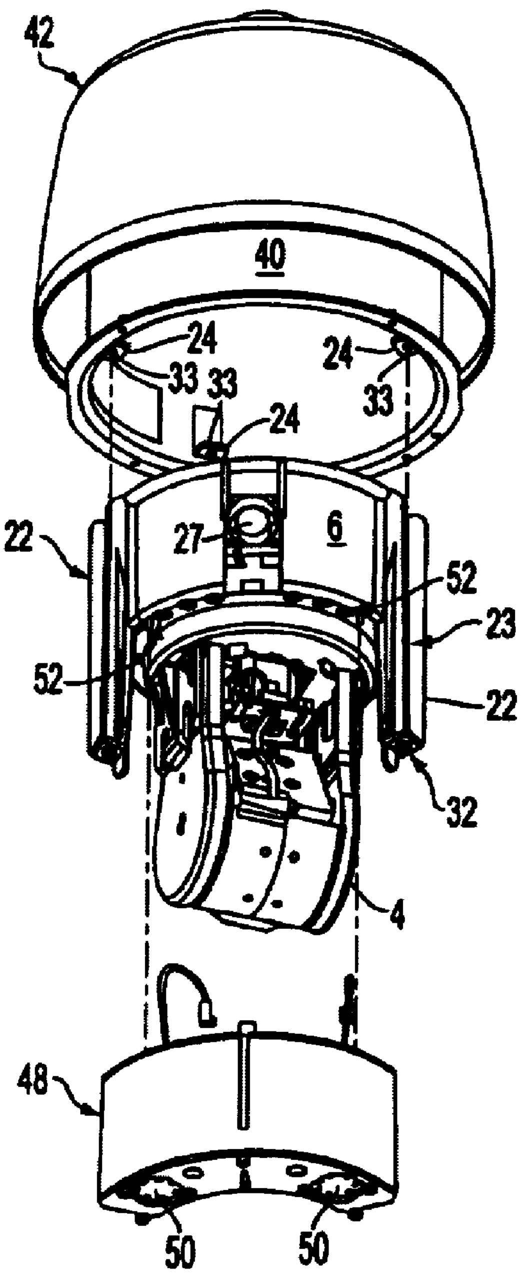
FIG. 5 is an exploded lower perspective view of an alternate embodiment of the present invention with heater for outdoor applications.
Figure 6:
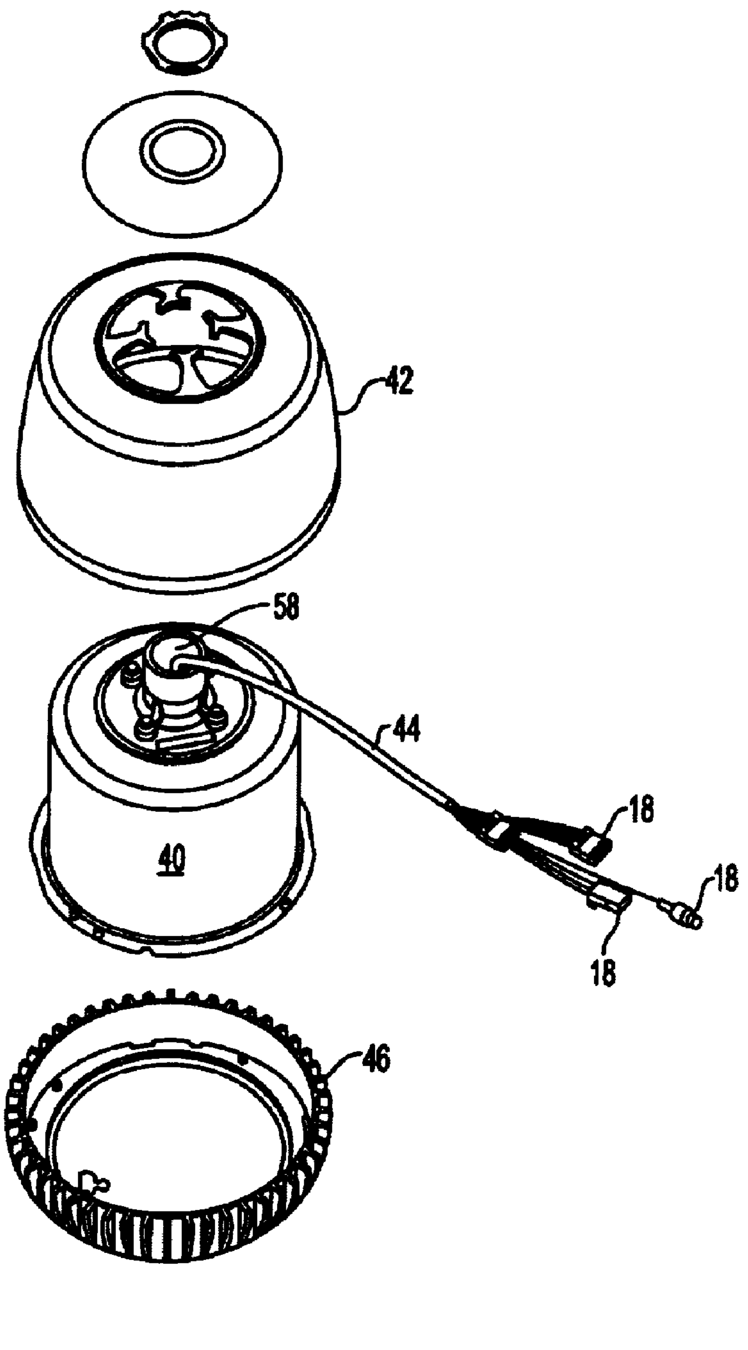
FIG. 6 an exploded upper perspective view of the embodiment of FIG. 5.

Referring to FIGS. 5 and 6, housing 40, which is identical to housing 8 except mounting clamps 12 are not needed, is installed in an enclosure 42 instead of being enclosed within a ceiling. Chassis 6 in inserted into housing 40 in the same manner as described above for housing 8. Connectors 18 are shown extending out of housing 40 as part of blind mating cable assembly or pigtail 44 and are not connected to the housing as shown in FIG. 2. Pigtail 44 extends from a blind mating connector within housing 40 (not shown) that connects to blind mating connector 28 on PCB 26. Pigtail 44 can be used in both housing 8 and housing 40 embodiments. In housing 8, pigtail 44 is coiled within housing 8 and all the connectors are mounted on housing 8, and in housing 40, pigtail 44 extends outside of housing 40 and only the blind mating connector is mounted within housing 40. Using pigtail 44 with both housing 8 and housing 40 embodiments reduces the number of inventory items required, and reduces manufacturing costs. Pigtail 44 extends through enclosure 42 and connectors 18 mate with connectors on the wiring harness of a video surveillance camera system. Optical quality dome bubble 46 can be installed at the lower end of housing 40.

Figure 7:
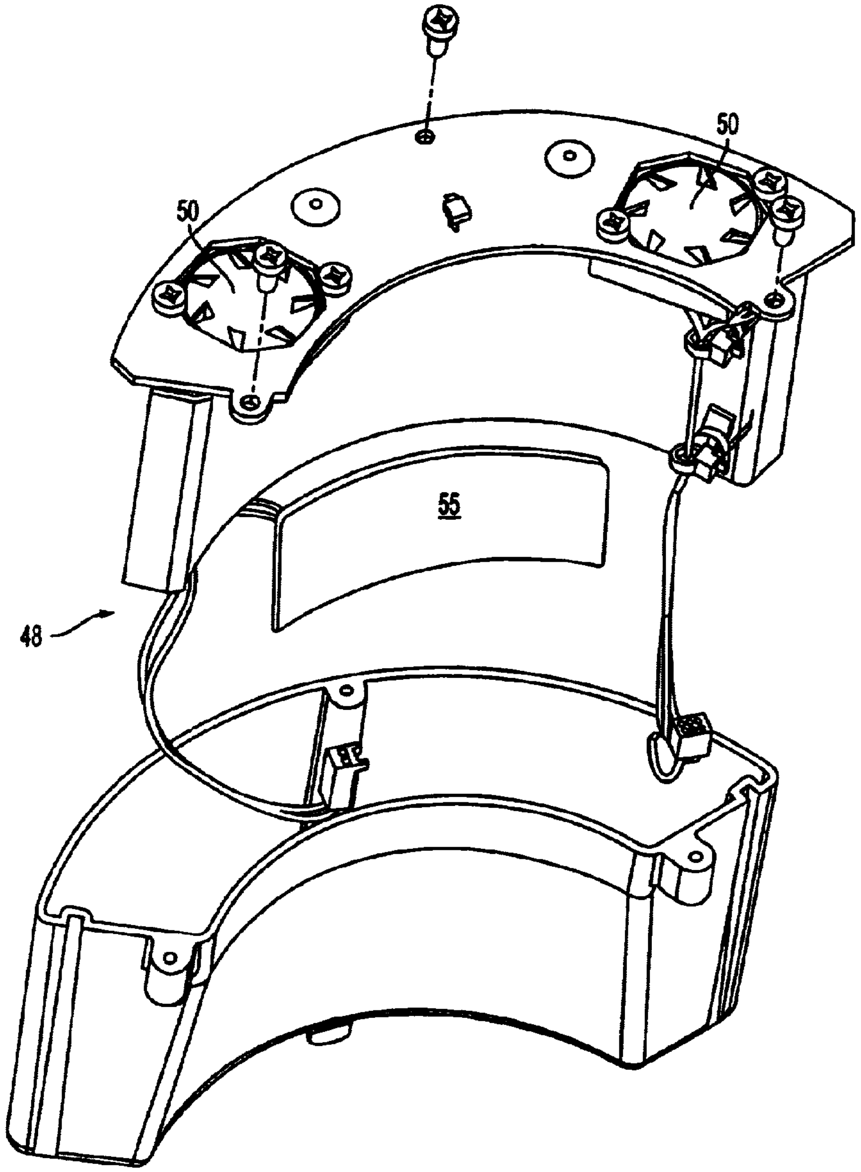
FIG. 7 is an exploded perspective view of the heater assembly used with the embodiment of FIG. 5.

Referring to FIG. 7, if enclosure 42 is used in an outdoor installation, fan and heater assembly 48 can be connected to chassis 6, as shown in FIG. 5. A plurality of apertures 52 on chassis 6 and fan 27 in conjunction with vents 54 (shown in FIG. 3) assist fans 50 with air circulation through chassis 6. Fans 50 circulate air across the interior surface of dome bubble 46, through apertures 52, across printed circuit board 26, across pan motor 25, and across thermostatically controllable heater 55. The air flow within housing 40 and across dome bubble 46 distributes heat evenly throughout housing 40, cooling the pan motor 25 and PCB 26 in warm weather, and defogging and deicing dome bubble 46 in humid and cold weather. The air flows unidirectionally in a similar manner to that disclosed in U.S. Pat. No. 6,061,087, the disclosure of which is incorporated herein by reference. With the improvement herein being that the air flows across the interior of the dome bubble, and across printed circuit board 26 and pan motor 25. Fan 27 assists fans 50 in the air flow across printed circuit board 26 and pan motor 25. Caps 53 as shown in FIG. 1 can be used to cap apertures 52 for indoor installations.

Referring back to FIG. 3, switches 56 are used to select the appropriate address for the video camera assembly 4 for proper interface with the video surveillance camera system. The video surveillance camera system may have many cameras and each must have a unique address for proper control and monitoring. During installation of the dome camera, switches 56 must be selected to correspond to the correct address for the particular dome camera placement within the video surveillance system. For enclosure 42, switches 56 are positioned on PCB 26 so that selection of the proper address can be selected through aperture 58. Therefore, enclosure 42, housing 40, chassis 6, and dome bubble 46 can be fully assembled at the factory, shipped, and installed without the need to disassemble to reach the switches 56 at the installation site. For ceiling mounted installations, the switches are also easily switched and the proper address selected through a suitable opening 57 in the top portion of housing 8, as shown in FIG. 2.

PCB 26 can include one or more LEDs (not shown), or other light emitting device, used for camera set-up and servicing. The LEDs can be different colors and/or positions. The LEDs must be viewed while the camera assembly 4 is energized and are positioned on the lower side of PCB 26. To enable an installer to view the LEDs from below the chassis 6 and camera assembly 4 when it is installed in housing 8 or housing 40, an LED view port 60 extends from adjacent each LED on PCB 26 to an unobstructed position on the lower side of chassis 6. The glow from the LED can thus be seen from below the installed camera assembly. The LED view port 60 can be funnel shaped as illustrated in FIG. 3 to more easily view the LED from below.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A video surveillance camera chassis for mounting a video surveillance camera in a video surveillance camera housing, comprising:

a support member having a lower end adapted for installation of a video surveillance camera and a plurality of positioning members disposed on a perimeter of said support member, said positioning members being engageable with a plurality of alignment flanges on the interior of a video surveillance camera housing to guide said support member into a preselected position within the housing, each of said positioning members include a shoulder for releaseably engaging the corresponding alignment flange, each of said shoulders being moveable between a first position butted against the flange to capture said support member in said preselected position and a second position free of the flange for removal of said support member.

2. The apparatus of claim 1 wherein each positioning member further comprising means for biasing said shoulder in said first position.

3. The apparatus of claim 1 further comprising a first connector connected to said support member, said first connector being mateable with a second connector disposed on the interior of the housing, wherein when said support member is captured in said preselected position, said first connector and the second connector are in mateable relation to each other, and including at least one fastener for compressing said support member toward the upper end of the housing to mate said first connector and the second connector together and to secure said support member to the housing.

4. The apparatus of claim 3 further comprising a printed circuit board connected to said support member and having at least one LED, said support member having at least one LED view port that corresponds to said at least one LED for remotely viewing said LED from below said support member, said first connector being connected to said printed circuit board.

5. The apparatus of claim 4 wherein said LED view port comprises a substantially funnel shaped tube that extends from adjacent said LED to a lower surface of said support member.

6. The apparatus of claim 1 further comprising a video surveillance camera housing and an enclosure having said housing mounted therein, said support member being mounted within said housing and an optical surveillance camera dome cover connected to a lower end of said housing.

7. The apparatus of claim 6 further comprising a printed circuit board connected to said support member, said printed circuit board including at least one switch that is selectable from the exterior of said enclosure without disassembly of said support member, said housing, said dome cover, and said enclosure.

8. The apparatus of claim 7 wherein said printed circuit board further comprising at least one LED and at least one LED view port that corresponds to said at least one LED for remotely viewing said LED from below said enclosure.

9. The apparatus of claim 8 wherein said LED view port comprises a substantially funnel shaped tube that extends from adjacent said LED to a lower surface of said support member.

10. The apparatus of claim 7 further comprising a wiring pigtail having a first connector disposed at a first end and at least a second connector disposed at a second end, said first connector being mateable with a third connector disposed on said printed circuit board, the second end of said pigtail extending to the exterior of said housing, said connector disposed on the second end of said pigtail being releaseably connectable to a video surveillance camera monitoring system.

11. The apparatus of claim 7 further comprising at least one fan attachable to said support member for circulating air across said printed circuit board, across a camera pan motor attached to said support member, and across the interior surface of said dome cover.

12. The apparatus of claim 11 further comprising a controllable heater element attachable to said support member, said air circulating across said controllable heater element.

13. The apparatus of claim 12 wherein said at least one fan and said heater element are both attached to a fan support member, said fan support member being attachable to said support member, said fan support member having a first plurality of apertures, said support member having a second plurality of apertures, said first and said second plurality of apertures aligning with each other when said fan support member is attached to said support member, wherein air circulates through said first and said second plurality of apertures.

14. The apparatus of claim 13 further comprising a second fan mounted on said support member to assist in air flow across said printed circuit board and across the camera pan motor, and wherein said air flows substantially unidirectionally across the interior surface of said dome cover.

15. A video surveillance camera enclosure, comprising:

a camera housing for receiving a video surveillance camera chassis through a lower end, said housing adapted for insertion into an opening in a ceiling member and including a connector disposed on an upper end of said housing for electrical connection to a video surveillance camera monitoring system, said housing including a flange disposed near the lower end of said housing for engaging a lower surface of the perimeter of said opening and a plurality of mounting clamps positioned around said housing and adjacent said flange, said mounting clamps having a first position relatively flush with the exterior of said housing so said housing can be inserted into the opening, and a second position extended substantially perpendicularly outward from the exterior of said housing for engaging an upper surface of the perimeter of the opening, said mounting clamps being moveable from said first position to said second position to capture a portion of the ceiling member adjacent said opening between said flange and said mounting clamps to secure said housing to the ceiling member, wherein the video surveillance camera chassis and a video surveillance camera attached to said chassis are insertable into the housing through the lower end;

wherein the distance between said mounting clamps and said flange is adjustable to provide compression on a portion of the ceiling member adjacent said opening between said flange and said mounting clamps.

16. The apparatus of claim 15 wherein the video surveillance camera chassis is disposed within said housing and further comprising a plurality of positioning members disposed on the perimeter of said chassis, said positioning members being engageable with a plurality of alignment flanges on the interior of said housing to guide said chassis into a preselected position within said housing, each of said positioning members including a shoulder for releaseably engaging said corresponding alignment flange, each of said shoulders being moveable between a first position butted against said flange to capture said chassis in said preselected position and a second position free of said flange for removal of said chassis.

17. The apparatus of claim 16 wherein each positioning member further comprises means for biasing said shoulder in said first position.

18. The apparatus of claim 16 further comprising a first connector disposed on the interior of said housing in the upper end adapted to mate with a second connector connected to said video surveillance camera chassis, wherein when said chassis is captured in said preselected position, said first and second connectors are in mateable relation to each other, and including at least one fastener for compressing said chassis toward the upper end of said housing to mate said first and second connectors together and to secure said chassis to said housing.

19. The apparatus of claim 18 further comprising a printed circuit board connected to said video surveillance camera chassis and having at least one LED, said chassis including at least one LED view port that corresponds to said at least one LED for remotely viewing said LED from below said housing, said second connector being connected to said printed circuit board.

20. The apparatus of claim 19 wherein said LED view port comprises a substantially funnel shaped tube that extends from adjacent said LED to a lower surface of said chassis.

21. The apparatus of claim 16 further comprising a switch connected to said chassis and being switchable from the exterior of said housing without the need to remove said chassis.

22. A video surveillance camera enclosure, comprising:

a camera housing for receiving a video surveillance camera chassis through a lower end, said housing adapted for insertion into an opening in a ceiling member and including a blind connector disposed on an upper end of said housing for electrical connection to a video surveillance camera monitoring system, said housing including a flange disposed near the lower end of said housing for engaging a lower surface of the perimeter of said opening and a plurality of mounting clamps positioned around said housing and adjacent said flange, said mounting clamps having a fist position relatively flush with the exterior of said housing so said housing can be inserted into the opening, and a second position extended substantially perpendicularly outward from the exterior of said housing for engaging an upper surface of the perimeter of the opening, said mounting clamps being moveable from said first position to said second position to capture a portion of the ceiling member adjacent said opening between said flange and said mounting clamps to secure said housing to the ceiling member, wherein the video surveillance camera chassis and a video surveillance camera attached to said chassis are insertable into the housing through the lower end.

23. The apparatus of claim 22 wherein the distance between said mounting clamps and said flange is adjustable to provide compression on a portion of the ceiling member adjacent said opening between said flange and said mounting clamps.

24. The apparatus of claim 22 further comprising a protective cover for said upper end of said housing.

25. The apparatus of claim 22 further comprising an optical quality, injection molded surveillance camera dome cover attachable to said lower end of said housing.

26. The apparatus of claim 22 wherein the video surveillance camera chassis is disposed within said housing and further comprising a plurality of positioning members disposed on the perimeter of said chassis, said positioning members being engageable with a plurality of alignment flanges on the interior of said housing to guide said chassis into a preselected position within said housing, each of said positioning members including a shoulder for releaseably engaging said corresponding alignment flange, each of said shoulders being moveable between a first position butted against said flange to capture said chassis in said preselected position and a second position free of said flange for removal of said chassis.

27. The apparatus of claim 26 wherein each positioning member further comprises means for biasing said shoulder in said first position.

28. The apparatus of claim 26 further comprising a first connector disposed on the interior of said housing in the upper end adapted to mate with a second connector connected to said video surveillance camera chassis, wherein when said chassis is captured in said preselected position, said first and second connectors are in mateable relation to each other, and including at least one fastener for compressing said chassis toward the upper end of said housing to mate said first and second connectors together and to secure said chassis to said housing.

29. The apparatus of claim 28 further comprising a primed circuit board connected to said video surveillance camera chassis and having at least one LED, said chassis including at least one LED view port that corresponds to said at least one LED for remotely viewing said LED from below said housing, said second connector being connected to said printed circuit board.

30. The apparatus of claim 19 wherein said LED view port comprises a substantially funnel shaped tube that extends from adjacent said LED to a lower surface of said chassis.

31. The apparatus of claim 26 further comprising a switch connected to said chassis and being switchable from the exterior of said housing without the need to remove said chassis.

* * * * *